(12) United States Patent
Brannon

(10) Patent No.: US 8,764,867 B2
(45) Date of Patent: Jul. 1, 2014

(54) AIRCRAFT OIL FLOW MANAGEMENT SYSTEM FOR INVERTED FLIGHT

(76) Inventor: Gregory Ray Brannon, Weston, WV (US)

( * ) Notice: Subject to any disclaimer, the term of this patent is extended or adjusted under 35 U.S.C. 154(b) by 136 days.

(21) Appl. No.: 13/572,671

(22) Filed: Aug. 12, 2012

(65) Prior Publication Data

US 2014/0041345 A1  Feb. 13, 2014

(51) Int. Cl.
*F02C 7/06* (2006.01)

(52) U.S. Cl.
USPC .............. 55/385.3; 55/394; 55/423; 55/425; 184/6.24; 244/58; 123/196 A

(58) Field of Classification Search
USPC ............ 55/306, 409, 400, 408, 385.1, 385.3, 55/317, DIG. 19, DIG. 28, DIG. 30; 95/270, 95/277; 184/6.11, 11.2; 60/39.08; 415/111, 112, 175, 229, 169.2, 168.1, 415/168.4
See application file for complete search history.

(56) References Cited

U.S. PATENT DOCUMENTS

| | | | |
|---|---|---|---|
| 7,107,646 B2 * | 9/2006 | Cho .................................. | 15/352 |
| 7,377,110 B2 * | 5/2008 | Sheridan et al. ................. | 60/772 |
| 8,002,864 B2 * | 8/2011 | Earith et al. ..................... | 55/409 |
| 8,051,952 B2 * | 11/2011 | Bart et al. ..................... | 184/6.11 |
| 8,128,732 B2 * | 3/2012 | Hoijtink et al. .................. | 95/35 |

* cited by examiner

*Primary Examiner* — Duane Smith
*Assistant Examiner* — Minh-Chau Pham
(74) *Attorney, Agent, or Firm* — Brian G. Brannon

(57) ABSTRACT

An oil flow management system reduces the amount of oil directed from an aircraft engine to the environment outside of the aircraft, even when the aircraft is in inverted flight. This decreases the amount of oil that becomes attached to exterior surfaces of the aircraft fuselage. A gaseous mixture including air and oil is directed from the aircraft engine to a separator, which separate the mixture into a gaseous component and an oil component. The oil component is directed from the separator to a reservoir via a unidirectional valve. When in a first orientation, the unidirectional valve allows oil to flow from the separator to the reservoir. However, when in a second orientation, the unidirectional valve blocks oil from flowing from the reservoir to the separator.

7 Claims, 3 Drawing Sheets

AIRCRAFT OIL FLOW MANAGEMENT SYSTEM FOR INVERTED FLIGHT

BACKGROUND

This invention relates generally to aircraft oil flow systems, and more specifically to a system for managing oil flow from an aircraft engine during normal and inverted flight.

During operation of an internal combustion engine, a gaseous mixture of unburned fuel and other exhaust gases is directed out of the engine. This gaseous mixture also frequently includes small amounts of oil that was used to lubricate mechanical components of the engine. Although much of this gaseous mixture is directed out of the engine using an exhaust pipe, a portion of this gaseous mixture is often not directed to the exhaust pipe and remains in the engine. In aircraft, the portion of the gaseous mixture not directed through the exhaust pipe is commonly directed out of the engine and using a breather tube that has an opening outside of the fuselage of the aircraft. While this configuration prevents degradation of engine performance, oil in the gaseous mixture is frequently deposited on exterior surfaces of the aircraft when directed out of the breather tube during flight. Because of flight speeds and airflow around the fuselage, small amounts of oil in the gaseous mixture may be spread across large areas of the aircraft fuselage, causing streaking or other areas of discoloration that may be difficult to remove.

In some configurations, the gaseous mixture from the engine is directed to an air/oil separator before being expelled from the aircraft. The air/oil separator removes oil from the gaseous mixture while directing the gaseous components outside of the aircraft. However, conventional oil separators store oil separated from the gaseous mixture in the separator itself, so changes in aircraft orientation reposition the oil in the air/oil separator, causing some of the stored oil to be directed out of the aircraft, and onto the fuselage, via the breather tube along with gaseous components. For example, during inverted flight oil stored in the air/oil separator transitions to a different surface of the air/oil separator, so a portion of the stored oil to be captured by the flow of the gaseous components and to be directed outside of the aircraft.

SUMMARY

An oil flow management system reduces the amount of oil directed from an aircraft engine to the environment outside of the aircraft, even when the aircraft is in inverted flight. This decreases the amount of oil that that is deposited on exterior surfaces of the aircraft fuselage. The oil flow management system also stores oil separated from a gaseous mixture that is directed outside of the engine, allowing subsequent analysis of the separated oil to evaluate engine operation and/or performance.

A breather line is coupled to an engine and has an input port that receives a gaseous mixture including one or more gases and oil from the engine. The mixture includes one or more of exhaust gases, unburned fuel, oil and other combustion by-products. A separator is coupled to the breather line so that the gaseous mixture is directed from the engine to the separator via the breather line. The separator separates the gaseous mixture into a gaseous component and an oil component, which is directed to a collection surface of the separator. An output port of the separator is coupled to an output breather line so the gaseous component of the gaseous mixture is directed to the output breather line via the output port. The gaseous component is directed to the environment outside of the aircraft via the output breather line. For example, the output breather line has an exhaust opening external to an exterior surface of the aircraft fuselage.

To prevent the oil component of the gaseous mixture from being directed to the environment outside of the aircraft via the output breather line, an inlet of a unidirectional valve is coupled to an orifice of the collection surface of the separator. When in a first orientation, the unidirectional valve is configured to allow the oil component to flow from the inlet toward an outlet of the unidirectional valve. A reservoir is coupled to the unidirectional valve outlet, allowing the oil component to be directed from the separator to the reservoir for storage. In one embodiment, the unidirectional valve allows the oil component to flow from the inlet toward the outlet when a plane including the inlet is above a plane including the outlet.

When the unidirectional valve is in a second orientation, it is configured to block oil in the reservoir from flowing from the outlet toward the inlet. This prevents oil stored in the reservoir from flowing through the unidirectional valve and re-entering the separator. For example, when the plane including the outlet is above the plane including the inlet, the unidirectional valve blocks oil flow from the outlet toward the inlet. In many embodiments, the unidirectional valve has the second orientation when the aircraft is in an inverted flight state where the reservoir is higher than the separator (in contrast with normal flight, where the separator is higher than the reservoir). Hence, the unidirectional valve prevents oil previously separated from the gaseous mixture of air and oil from re-entering the separator and being directed to the environment external to the aircraft in different aircraft orientations.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
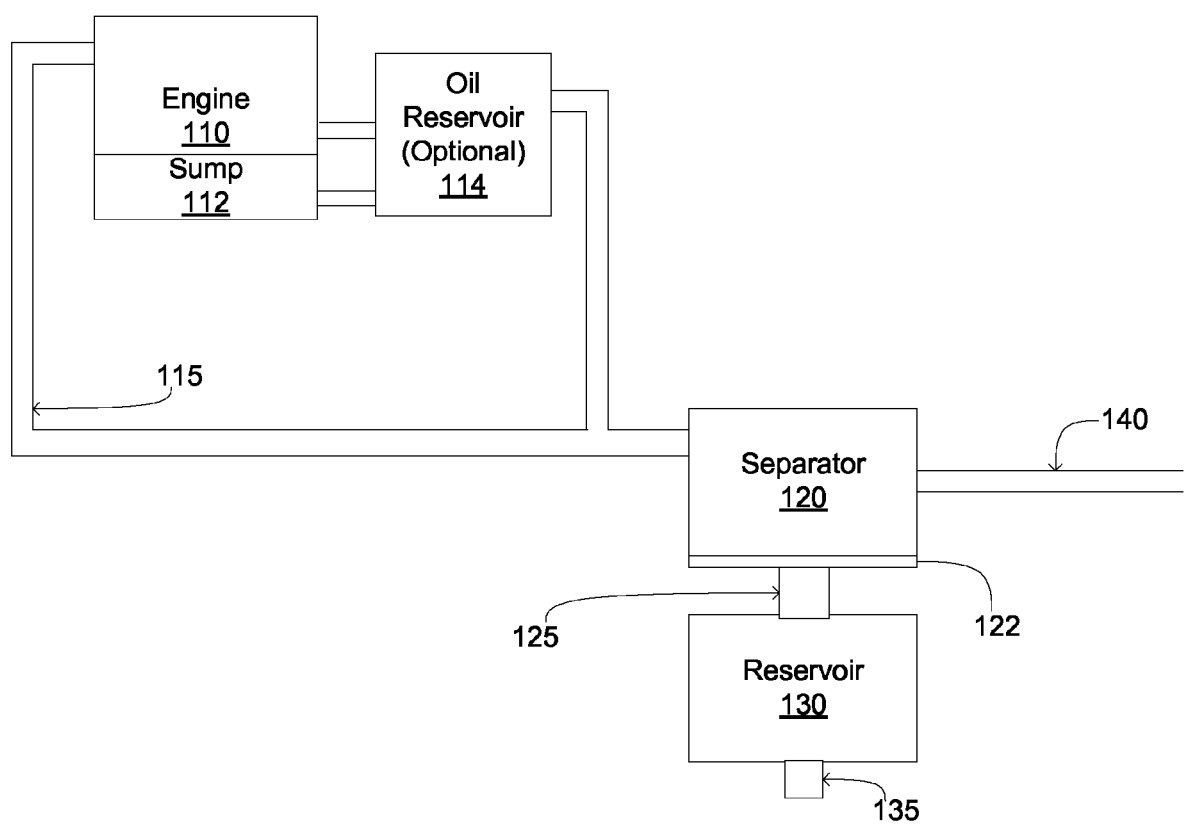
FIG. 1 is a block diagram of an aircraft oil flow management system, in accordance with one embodiment of the invention.

FIG. 1 is a block diagram of one embodiment of an aircraft oil flow management system 100. For clarity, FIG. 1 does not illustrate additional conventional components of an aircraft. Additionally, in different embodiments, the aircraft oil flow management system 100 may include additional components than those shown by FIG. 1.

The engine 110 converts a fuel into mechanical energy used to power a propeller, propulsive nozzle or other device for generating thrust for the aircraft. In many embodiments, the engine 110 combusts fuel in a combustion chamber, with one or more mechanical components of the engine 110 moved by the expansion of high-pressure gases produced during combustion. Any type of engine 110 may be used in the aircraft oil flow management system 100. Examples of engines 110 include a radial engine, a horizontally opposed engine, a V-type engine or any other suitable type of engine.

Oil is pumped into the engine 110 to lubricate mechanical components, and is collected by a sump 112 as it flows through the engine 100. An engine oil pump retrieves oil from the sump 112 and directs the oil to lubrication points of engine mechanical components. In a wet sump configuration the sump 112 is a pan located within the engine 110 and below a crankcase of the engine 110.

Alternatively, a dry sump configuration may be used where an oil reservoir 114 is external to the engine 110, and oil is initially collected in an oil reservoir 114, which may be below the engine crankcase. Oil is drawn from the oil reservoir 114 and circulated through the engine 110 by one or more pumps. In the try sump configuration, oil circulated through the engine 110 collects in the sump 112, where it is pumped from the sump 112 to the oil reservoir 114 by one or more pumps.

When the engine 110 combusts fuel, excess gases are created that may clog the engine 110 or otherwise impair performance if they remain within the engine 110. While many of these gases are directed out of the engine 110 through an exhaust line, some of the excess gases remain in the engine 110. Often, the remaining excess gases, which are typically a gaseous mixture of oil and gaseous components, are routed into the engine crankcase. In the crankcase, some oil used to lubricate the engine is aerosolized and combined with the excess gases. A breather line 115 is coupled to the engine 110 to direct this gaseous mixture out of the engine crankcase. An input of the breather line 115 is within the crankcase of the engine 110 and an exhaust output that is external to the aircraft. When a dry sump configuration is used, the breather line 115 may have an additional input within the oil reservoir 114, as shown in the example of FIG. 1. This allows the breather line 115 to direct gases created during combustion to the environment outside of the aircraft.

However, oil included in the gaseous mixture of oil and gas directed through the breather line 115 frequently becomes attached to the exterior of the aircraft's fuselage when exiting the output of the breather line 115. While the amount of oil included in this gaseous mixture is typically small, the airflow around the aircraft fuselage and the aircraft's speed during flight causes the small amount of oil to disperse and become deposited on a relatively large surface area of the fuselage. Commonly, this results in oil streaks along the fuselage behind the breather line output.

To reduce the amount of oil exiting the breather line output, the breather line 115 is coupled to a separator 120 so that the mixture of oil and gases is directed from the engine 110 to the separator 120 via the breather line 115. The separator 120 separates the gaseous mixture into a gaseous component and an oil component using any suitable technique. For example, the gaseous mixture circularly travels within the interior of the separator 120 at a velocity sufficient for the oil to contact interior surfaces of sides of the separator 120 and form oil droplets. The oil droplets are directed from the sides of the separator 120 to a collection surface 122 of the separator 122 while the gaseous component of the mixture is directed from the separator 120 to an output breather line 140.

The collection surface 122 of the separator 120 includes an orifice allowing the oil extracted from the gaseous mixture to flow out of the separator 120. An inlet of a unidirectional valve 125 is coupled to the orifice so oil travels from the separator 120 through the orifice of the collection surface 122 and through the inlet of the unidirectional valve 125. Similarly, an outlet of the unidirectional valve 125 is coupled to a reservoir 130. In the example shown by FIG. 1, the reservoir 130, which may be any suitable container for storing oil or other fluid, includes a drain 135, which allows removal of stored oil from the reservoir 130. In some embodiments, a return line may be coupled to the drain 135 and to the engine 100, allowing oil stored in the reservoir 130 to be directed back into the engine 110 for lubrication.

The unidirectional valve 125 has an open state and a closed state, allowing it to restrict oil flow through the unidirectional valve 125 to a single direction from inlet towards outlet. When the unidirectional valve 125 is in the open state, a channel between the inlet and the outlet is unobstructed. Conversely, the channel between the inlet and outlet is blocked when the unidirectional valve 125 is in the closed state. Hence, the closed state prevents oil from flowing between the inlet and outlet.

In one embodiment, the orientation of the unidirectional valve 125 determines whether it is in the open state or in the closed state. For example, when the inlet of the unidirectional valve 125 is in a plane that is higher than a plane including the outlet, the unidirectional valve 125 is in the open state. This allows oil to flow from the orifice of the collecting surface 122 through the unidirectional valve 125 into the reservoir 130 for storage. However, when the inlet of the unidirectional valve 125 is in a plane that is lower than a plane including the outlet, the unidirectional valve 125 is in the closed state, preventing oil from flowing from the reservoir 130 through the unidirectional valve 125 and into the separator 120. As further described below in conjunction with FIGS. 2A and 2B, the unidirectional valve 125 may be a tipover valve, or similar valve, including a weighted bearing that moves within the unidirectional valve 125 to block the channel between the outlet and inlet.

Example Operation

Figure 2A:
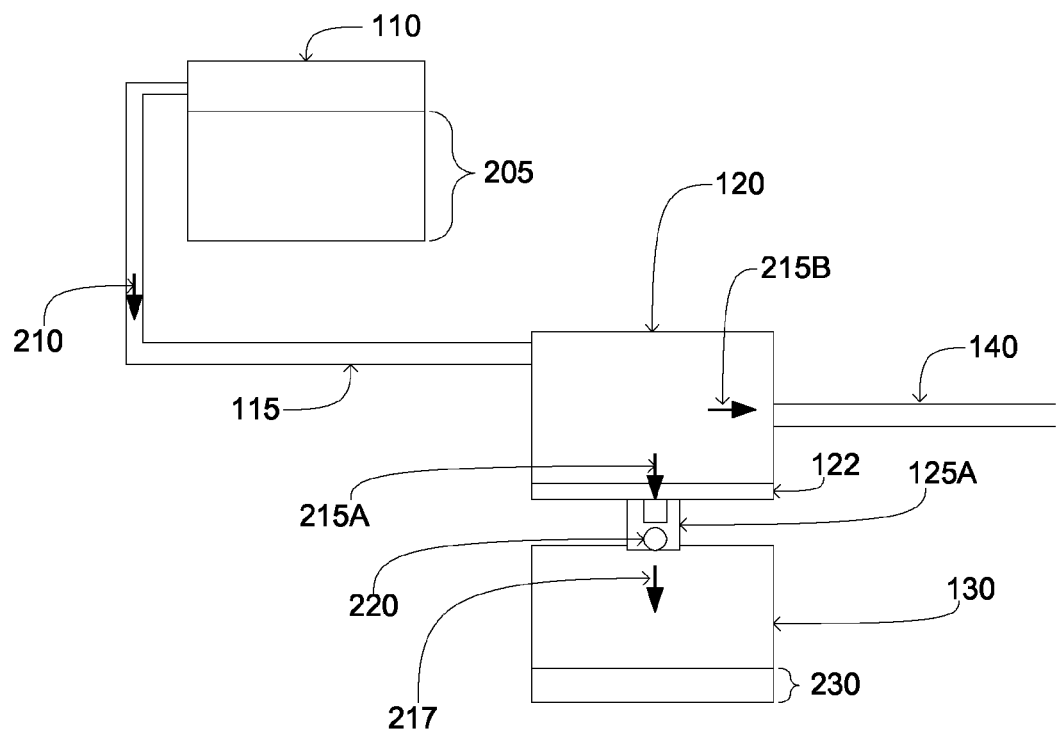
FIG. 2A is a block diagram illustrating oil flow during normal flight, in accordance with one embodiment of the invention.

FIG. 2A shows one embodiment of oil flow through the oil flow management system 100 in an aircraft during normal flight. During normal flight, an input of the breather line 115 is positioned above an oil level 205 of a sump 112 in an engine 110 of the aircraft. For example, the input of the breather line is in a crankcase of the engine 110. Accordingly, the breather line 115 directs 215 a gaseous mixture including gases and oil, which is not directed to an exhaust line, away from the engine 110. A separator 120 receives the gaseous mixture from the breather line 115 and separates the gaseous mixture into a gaseous component and an oil component. For example, the separator 120 directs the gaseous mixture in a circular flow within the separator 120, causing oil in the gaseous mixture to contact interior surfaces of sides of the separator 120 and form oil droplets. As the gaseous mixture circularly flows within the separator 120, the size of the oil droplets increases and the oil droplets are directed 215A to a collection surface 122 of the separator 120 while the gaseous component of the mixture is directed 215B to the output breather line 140.

The collection surface 122 has an orifice that allows the oil component of the separated gaseous mixture to drain from the separator 120. An inlet of a unidirectional valve 125 is coupled to the orifice of the collection surface 122 while an outlet of the unidirectional valve 125 is coupled to a reservoir 130. When the unidirectional valve 125 is in an open state 125A, as shown in FIG. 2A, oil flows 217A from the orifice of the collection surface 122 through the inlet of the unidirectional valve 125 and through the outlet of the unidirectional valve 125 to the reservoir 130, which stores the oil component. In the example shown by FIG. 2A, the reservoir 130 has a stored oil level 230. As shown in FIG. 1, the reservoir 130 may include a drain 135, allowing oil to be drained from the reservoir 130 to reduce the stored oil level 230.

In one embodiment, the orientation of the unidirectional valve 125 determines whether the unidirectional valve 125 is in the open state 125A. For example, the unidirectional valve 125 is in the open state 125A when a plane including the inlet is above a plane including the outlet. The unidirectional valve 125 may be tipover valve or another valve including a weighted bearing 220 that moves within the unidirectional valve 125 to block the oil component from flowing from the outlet toward the inlet when the unidirectional valve 125 is in a closed state, which is further described below in conjunction with FIG. 2B. When the unidirectional valve 125 is in the open state 125A, the weighted bearing 220 does not block oil from flowing from the inlet towards the outlet. In other embodiments, however, the unidirectional valve 125 may have any suitable configuration allowing the oil component to flow from the inlet to the outlet in the open state 125A while blocking the oil component from flowing from the outlet to the inlet when in the closed state.

Figure 2B:
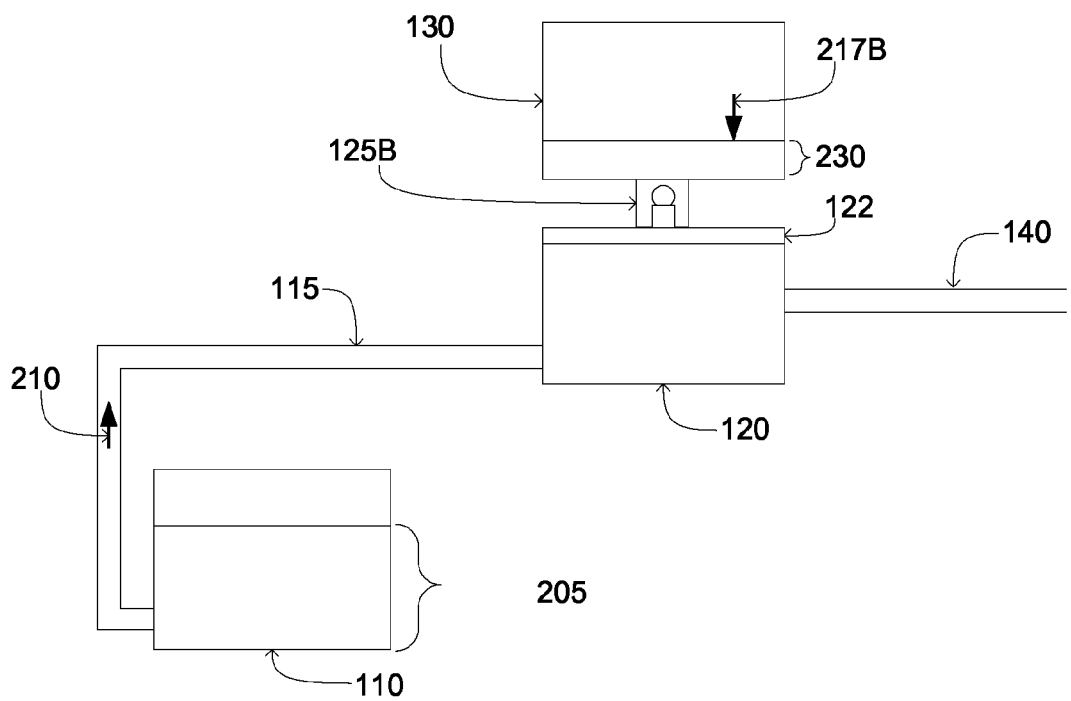
FIG. 2B is a block diagram illustrating oil flow during inverted flight, in accordance with one embodiment of the invention.

FIG. 2B illustrates oil flow though the oil flow management system 100 during inverted flight of an aircraft. During inverted flight, the input opening of the breather line 115 is below the oil level 205 of the sump 112 in the engine 110. The change in orientation from normal flight to inverted flight increases the amount of oil in the gaseous mixture directed 210 through the breather line 115. As described above, the separator 120 separates the gaseous mixture into a gaseous component and an oil component. The gaseous component is directed to the output breather line 140, where it is directed away from an aircraft fuselage, as described above.

However, during inverted flight, the collection surface 122 of the separator 120 is oriented above an additional surface of the separator 120 that is parallel to the collection surface 122. Accordingly, the oil component separated from the gaseous mixture is directed toward the additional surface of the separator 120, which is below the collection surface 122 during inverted flight. When the aircraft resumes normal flight, the collection surface 122 returns to a plane below the additional surface, so the oil component flows to the collection surface 122 to the reservoir 130 via the unidirectional valve 125, as described above in conjunction with FIG. 2A.

During inverted flight, the reservoir 130 is located in a plane above the collection surface 122, causing the oil stored in the reservoir 130 to flow 217B toward the collection surface 122. However, during inverted flight, the inlet of the unidirectional valve 125 is positioned in a plane below the plane including the outlet, so the unidirectional valve 125 is in a closed state 125B that prevents oil stored in the reservoir 130 from flowing into the separator 120 through the unidirectional valve 125. By being in the closed state 125B during inverted flight, the unidirectional valve 125 prevents oil in the reservoir 130 from re-entering the separator 120, where it is likely to be directed outside of the aircraft via the output breather line 140.

For example, the unidirectional valve 125 is a tipover valve or another type of valve including a weighted bearing 220. When the inlet of the unidirectional valve 125 is in a plane above the plane including the outlet of the unidirectional valve 125, as shown in FIG. 2A, the weighted bearing 220 rests on an interior surface of the unidirectional valve 125 so that a channel inside the unidirectional valve 125 between the inlet and the outlet is not blocked. This allows oil to flow through the channel from the inlet to the outlet, which directs the oil into the reservoir 130. However, during inverted flight, as shown in FIG. 2B, the inlet of the unidirectional valve 125 is in a plane below a plane including the outlet of the unidirectional valve 125. Accordingly, the weighted bearing 220 rests on a seal within the unidirectional valve 125 of the outlet, blocking the channel from the inlet to the outlet within the unidirectional valve 125.

Example Unidirectional Valve

Figure 3:
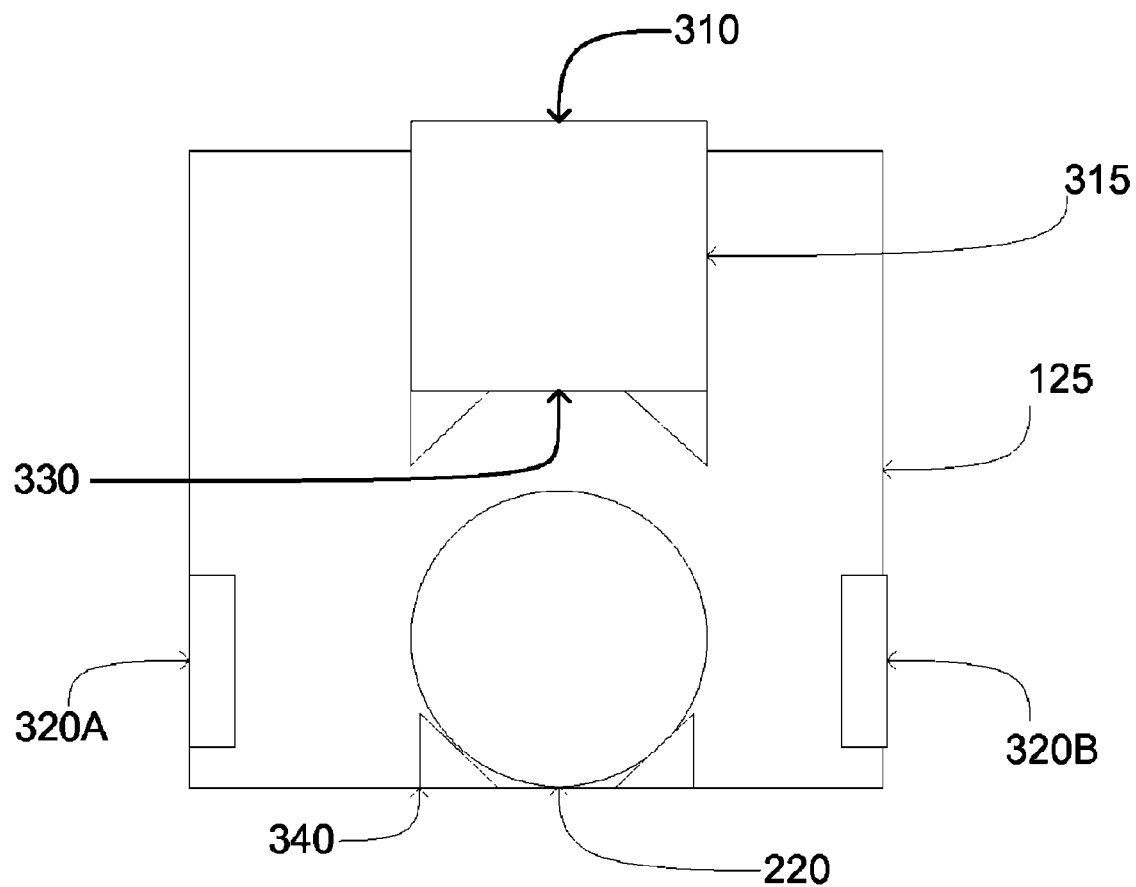
FIG. 3 is a cross-sectional view of a unidirectional valve including a weighted bearing, in accordance with one embodiment of the invention.

FIG. 3 shows one embodiment of a unidirectional valve 125 including a weighted bearing 220. The example unidirectional valve 125 includes an inlet 310, which is coupled to an orifice of a collection surface 122 of a separator 120, as described above in conjunction with FIGS. 1-2B. In FIG. 3, the inlet 310 directs oil, or another fluid, into a channel 315 within the unidirectional valve 125. The channel 315 has a seal 330 at an end of the channel 315 inside the unidirectional valve 125. When the unidirectional valve 125 is in an open state, oil is directed through the channel 315 and out of the unidirectional valve 125 via an outlet. In the example shown by FIG. 3, the outlet is two openings 320A, 320B on sides of the unidirectional valve 125 perpendicular to a plane including the inlet 310 and located in a plane parallel to the plane including the inlet 310. For example, the inlet 310 is positioned on an upper surface of the unidirectional valve 125 and the openings 320A, 320B are located on sides of the unidirectional valve 125 perpendicular to the upper surface and in a plane below the plane including the upper surface of the unidirectional valve 125.

When the unidirectional valve 125 is in a closed state, the plane including the openings 320A, 320B is above the plane including the inlet 310. This causes the weighted ball 220 to transition from a seat 340, where it rests when the unidirectional valve 125 is in the open state, to contact the seal 330. When the weighted ball 220 contacts the seal 330, oil is blocked from entering the channel 315 from a direction opposite the inlet 310. While the plane including the openings 320A, 320B is above the plane including the inlet 310, gravitational force maintains contact between the weighted ball 220 and the seal 330, preventing oil from entering the channel 315 via the seal 330. However, when the plane including the openings 320A, 320B is below than the plane including the inlet 310, the weighted ball 220 contacts the seat 340, creating an opening for oil to flow from the seal 330 through the openings 320A, 320B and out of the unidirectional valve 125.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. An oil flow management system in an aircraft comprising:
   a breather line coupled to an engine included in the aircraft, the breather line receiving a gaseous mixture including oil and gases from the engine included in the aircraft;

a separator included in the aircraft, the separator having an input port coupled to the breather line and including a collection surface and an output port, the separator configured to receive the gaseous mixture from the breather line and separate the mixture into an gaseous component directed toward the output port and into an oil component directed toward the collection surface;

an output breather line coupled to the output port of the separator, the output breather line configured to direct the gaseous component in a direction away from an exterior surface of a fuselage of the aircraft;

a unidirectional valve included in the aircraft, the unidirectional valve having an inlet coupled to an orifice of the collection surface, the unidirectional valve including a weighted bearing configured to move within the unidirectional valve, the weighted bearing configured to open a channel from the inlet to an outlet when a plane including the inlet is above a plane including the outlet and the weighted bearing configured to block the channel from the inlet to the outlet to prevent the oil component from flowing from the outlet toward the inlet when the plane including the inlet is below the plane including the outlet; and a reservoir included in the aircraft and coupled to the outlet of the unidirectional valve, the reservoir configured to receive the oil component from the unidirectional valve.

2. The system of claim 1, wherein the reservoir includes a drain for directing the oil component out of the reservoir.

3. The system of claim 1, wherein the output breather line includes an exhaust port external to the fuselage of the aircraft.

4. A system comprising:
a breather line coupled to an engine included in an aircraft, the breather line receiving a gaseous mixture including oil and gases from the engine included in the aircraft;

a separator included in the aircraft, the separator having an input port coupled to the breather line and including a collection surface and an output port, the separator configured to receive the gaseous mixture from the breather line and separate the mixture into an gaseous component directed toward the output port and into an oil component directed toward the collection surface;

a unidirectional valve included in the aircraft, the unidirectional valve having an inlet coupled to an orifice of the collection surface and an outlet, the unidirectional valve that comprises a weighted bearing configured to move within a channel within the unidirectional valve from the inlet and the outlet to block the oil component from flowing from the outlet toward the inlet when a plane including the inlet is below a plane including the outlet, the weighted bearing also configured to move within the channel within the unidirectional valve to allow the oil component to flow from the inlet toward the outlet via the channel; and a reservoir included in the aircraft and coupled to the outlet of the unidirectional valve, the reservoir configured to receive the oil component from the unidirectional valve.

5. The system of claim 4, further comprising:
an output breather line coupled to the output port of the separator, the output breather line configured to direct the gaseous component in a direction away from an exterior surface of the aircraft including the engine.

6. The system of claim 4, further comprising:
a drain valve coupled to reservoir and configured to direct the oil component out of the reservoir.

7. A system comprising:
a separator included in an aircraft, the separator configured to receive a gaseous mixture including gases and oil from an engine included in the aircraft and to separate the mixture into a gaseous component and an oil component;

a reservoir included in the aircraft, the reservoir configured to receive and store the oil component;

a unidirectional valve included in the aircraft, the unidirectional valve having an inlet coupled to the separator included in the aircraft and an outlet coupled to the reservoir included in the aircraft, the unidirectional valve including a weighted bearing configured to allow the oil component to flow through a channel from the inlet toward the outlet when a plane including the separator is above a plane including the reservoir and configured to block the channel when the plane including the reservoir is above the plane including the separator to prevent the oil component from flowing from the outlet toward the inlet via the channel; and an output breather line coupled to an output port of the separator, the output breather line configured to direct the gaseous component in a direction away from an exterior surface of the aircraft including the engine.

* * * * *